Aug. 3, 1943.　　　　E. D. McARTHUR　　　　2,325,965
ELECTRIC VALVE FREQUENCY CHANGER
Original Filed Aug. 17, 1940
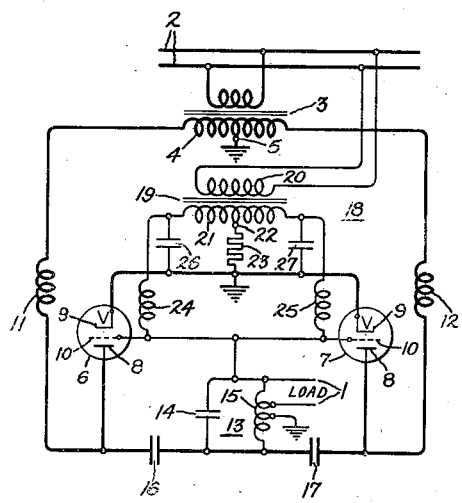
Inventor:
Elmer D. McArthur,
by Harry E. Dunham
His Attorney.

Patented Aug. 3, 1943

2,325,965

UNITED STATES PATENT OFFICE 2,325,965

ELECTRIC VALVE FREQUENCY CHANGER

Elmer D. McArthur, Schenectady, N. Y., assignor to General Electric Company, a corporation of New York Application April 15, 1941, Serial No. 388,702, now Patent No. 2,319,072, dated May 11, 1943, which is a division of application Serial No. 353,133, August 17, 1940, now Patent No. 2,288,362, dated June 30, 1942. Divided and this application April 25, 1942, Serial No. 440,429

3 Claims. (Cl. 250—36)

My invention relates to electric valve frequency changers and more particularly to electric valve circuits for supplying high frequency alternating currents to a load circuit from an alternating current source of commercial frequency.

This application is a division of my copending application Serial No. 388,702, filed April 15, 1941, Patent No. 2,319,072, dated May 11, 1943, which is a division of my copending patent application Serial No. 353,133, filed August 17, 1940, Patent No. 2,288,362 dated June 30, 1942. All of the above-identified applications are assigned to the assignee of the present application.

It is an object of my invention to provide a new and improved electric valve frequency changer circuit.

It is another object of my invention to provide a new and improved electric valve frequency changer circuit which is of simple construction and arrangement for energizing a high frequency load circuit from an alternating current source of commercial frequency.

It is a further object of my invention to provide a new and improved electric valve oscillator which is energized from a single phase alternating current supply circuit, and in which the biasing potential impressed on the grid of the electric valve is increased in magnitude during the negative half cycles of applied anode-cathode voltage derived from the supply circuit thereby decreasing or limiting the magnitude of the grid current and effecting a substantial increase in the efficiency of the oscillator.

Briefly stated, in the illustrated embodiment of my invention I provide a new and improved electric valve frequency changer for energizing a high frequency load circuit from a single phase alternating current source of commercial frequency. The system comprises a pair of electronic discharge devices of the high vacuum type, each including a control member or control grid, and which are connected to operate in conjunction with an oscillatory circuit or a tank circuit. Corresponding principal electrodes, such as the anodes or the cathodes, are connected directly to a point of reference potential or to ground, and a control circuit is provided for selectively controlling the magnitude of the negative unidirectional biasing potentials impressed on the control grids to decrease or limit the grid currents during the negative or inverse half cycles of anode-cathode voltage derived from the single phase supply circuit. The feature of selectively increasing the magnitude of the negative unidirectional biasing potential during the negative half cycles of applied anode-cathode voltage is disclosed and broadly claimed in my copending patent application Serial No. 388,702. The modification of my invention disclosed and claimed hereinafter relates to the specific control circuit for obtaining this type of control for high frequency electric valve generators which are energized from single phase alternating current supply circuits.

For a better understanding of my invention, reference may be had to the following description taken in connection with the accompanying drawing, and its scope will be pointed out in the appended claims. The single figure of the drawing diagrammatically illustrates an embodiment of my invention as applied to an oscillator for energizing a high frequency load circuit, such as a high frequency inductive furnace, from a single phase alternating current source of commercial frequency, and wherein the magnitude of the biasing potentials impressed on the grids of electronic discharge devices employed in the oscillator are selectively increased in magnitude during the negative or inverse half cycles of the voltage of source frequency.

The single figure of the drawing illustrates diagrammatically an embodiment of my invention as applied to an electronic or electric valve frequency changer or oscillator for energizing a high frequency load circuit 1 from a single phase alternating current supply circuit 2. The system comprises a transformer 3 having a secondary winding 4 provided with an intermediate or neutral connection 5 connected to ground or connected to a point of reference potential. A pair of electronic discharge devices 6 and 7 are arranged to operate in a push-pull relationship and each is provided with an anode 8, a cathode 9 and a control member or control grid 10. Filtering inductances 11 and 12 are connected in series relation with the associated portions of the secondary winding 4 and electronic discharge devices 6 and 7 to prevent the transmission of high frequency current to transformer 3. The electronic discharge devices 6 and 7 are of the high vacuum type and corresponding principal electrodes, such as cathodes 9, are connected to the point of reference potential or to ground. An oscillatory circuit 13, comprising a capacitances 14 and an inductance 15, is coupled to the anodes 8 of the electronic discharge devices 6 and 7 through capacitances 16 and 17. The load circuit 1 may be energized from the inductance 15 of the oscillatory circuit 13.

I provide a control circuit 18 which impresses on each of the grids 10 of electric discharge devices 6 and 7 a component of voltage derived from the supply circuit 2 through transforming means 19 which may comprise a primary winding 20 and a secondary winding 21, the latter of which is provided with an intermediate or neutral connection 22. A resistance 23 is connected between the neutral connection 22 and the ground or point of reference potential, and co-operates with the transforming means 19 to provide biasing potentials for the control grids 10 which selectively increase in magnitude during the respective low frequency negative half cycles of anode-cathode voltage applied to the electronic discharge devices 6 and 7. Inductances 24 and 25 are connected between the secondary winding 21 and grids 10 to prevent the transmission of the high frequency impulses of circuit 13 to the transformer 19 and resistance 23. Filtering capacitances 26 and 27 are also connected to by-pass the high frequency impulses so that high frequency voltage or current variations are not transmitted to transformer 19 or resistance 23.

It will be noted that in the embodiment of my invention illustrated, the current transmitted through resistance 23 is exclusively control grid current. That is, the anode-cathode currents of the electronic discharge devices 6 and 7 are not transmitted through this resistance.

The embodiment of my invention illustrated in the single figure of the drawing operates to limit the grid currents during negative half cycles of anode-cathode voltage, that is during the negative half cycles of the low frequency components of voltage derived from the supply circuit 2. The low frequency component of voltage introduced into control circuit 18 by means of transformer 19 together with the high frequency excitation operate to impress on the grids 10 of the electronic discharge devices 6 and 7 rectified unidirectional biasing voltages by virtue of the grid rectification characteristics of these electronic discharge devices. The biasing potential, or potentials, appear across the terminals of resistance 23 and the associated portions of the secondary winding 21, thereby selectively producing the desired increase in the grid biasing potentials at the times required.

It will be appreciated that by virtue of this type of circuit, the control circuit may be designed to transmit only relatively small values of current compared with the total output of the electric valve oscillator, since the control circuit does not transmit any portion of the anode-cathode currents and since the control circuit is independent of the anode-cathode circuits. Furthermore, the circuit is a simple arrangement for obtaining a selective increase in the magnitude of the biasing potentials, thereby limiting the magnitude of the control grid currents and effecting a substantial improvement in the efficiency of the system over that afforded by the prior art arrangements.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a single phase alternating current supply circuit, a high frequency alternating current load circuit, electric translating apparatus connected between said circuits and comprising an electric oscillator including a pair of electrically displaced windings having a point of reference potential, a pair of electronic discharge devices each connected to a different one of said windings and each including a plurality of principal electrodes comprising an anode and a cathode and a control grid and an oscillatory circuit energized by said windings and said electronic discharge devices, corresponding principal electrodes of said discharge devices being connected to said windings and different corresponding principal electrodes being connected directly to said point of reference potential, a control circuit connected to the grids of the electronic discharge devices and exclusive of the anode-cathode circuits of said electronic discharge devices for impressing on each of said grids a biasing potential having a greater value during the negative half cycles of voltage of said supply circuit applied across the associated principal electrodes than that applied during the positive half cycles and comprising a winding energized from said supply circuit and having an intermediate connection and a resistance connected between said intermediate connection and said point of reference potential, and means for coupling said control circuit to said oscillatory circuit.

2. In combination, a single phase alternating current supply circuit, a high frequency alternating current load circuit, electric translating apparatus connected between said circuits and comprising an electric oscillator including a pair of electrically displaced windings having a point of reference potential, a pair of electronic discharge devices each connected to a different one of said windings and each including a plurality of principal electrodes comprising an anode, a cathode and a control grid and an oscillatory circuit energized by said windings and said electronic discharge devices, corresponding principal electrodes of said discharge devices being connected to said windings and different corresponding principal electrodes being connected directly to said point of reference potential, a control circuit connected to the grids of the electronic discharge devices and exclusive of the anode-cathode circuits of said electronic discharge devices for impressing on said grids biasing potentials having greater negative values during the negative half cycles of voltage of said supply circuit applied across the associated principal electrodes than that applied during the positive half cycles and comprising transforming means energized from said supply circuit and including a winding having an intermediate connection and a resistance connected between said intermediate connection and said point of reference potential, and means for coupling said control circuit to said oscillatory circuit.

3. In combination, a single phase alternating current supply circuit, a high frequency alternating current load circuit, electric translating apparatus connected between said circuits and comprising an electric oscillator including a pair of electrically displaced windings having a point of reference potential, a pair of electronic discharge devices each connected to a different one of said windings and each including a plurality of principal electrodes comprising an anode, a cathode and a control grid and an oscillatory circuit energized by said windings and said electronic discharge devices, corresponding principal electrodes of said discharge devices being connected to said windings and different corresponding principal electrodes being connected directly to said point of reference potential, a control circuit connected to the grids of the electronic discharge devices and exclusive of the anode-cathode circuits of said electric discharge devices for impressing on said grids biasing potentials having greater negative values during the respective negative half cycles of voltage of said supply circuit applied across the associated principal electrodes than that applied during the positive cycles and comprising a transformer having a primary winding connected to said supply circuit and having a secondary winding including an intermediate connection and a resistance connected between said intermediate connection and said point of reference potential, and means for coupling said control circuit to said oscillatory circuit.

ELMER D. McARTHUR.